United States Patent [19]
Deitrich

[11] Patent Number: 5,520,186
[45] Date of Patent: May 28, 1996

[54] METHOD AND APPARATUS FOR CONTROLLING TRANSDUCER MULTIPLEXING IN ULTRASOUND IMAGING SYSTEM

[75] Inventor: Thomas L. Deitrich, Durham, N.C.

[73] Assignee: General Electric Company, Milwaukee, Wis.

[21] Appl. No.: 344,056

[22] Filed: Nov. 23, 1994

[51] Int. Cl.$^6$ ........................................ A61B 8/00
[52] U.S. Cl. ........................ 128/661.010; 73/626
[58] Field of Search ............... 128/660.070, 661.010; 73/626

[56] References Cited

U.S. PATENT DOCUMENTS 5,186,175  2/1993  Hirama et al. ............... 128/661.010
5,261,408  11/1993  Maslak et al. ................ 128/661.010
5,375,470  12/1994  Matsushima et al. .......... 128/661.010

*Primary Examiner*—Francis Jaworski
*Attorney, Agent, or Firm*—Dennis M. Flaherty; John H. Pilarski

[57] ABSTRACT

A method and apparatus for controlling multiplexing of a transducer having more elements than the imaging system has receive channels. The active aperture is shifted in increments of a predetermined number of transducer elements, e.g., eight. While the active aperture is maintained constant for a predetermined number of vectors, the phase center of the vectors in the group is shifted so that offset is minimized. In the case wherein the active aperture is successively shifted by eight elements, the offset is varied between +4 and −4 during the interval between shifts of the active aperture.

11 Claims, 9 Drawing Sheets

METHOD AND APPARATUS FOR CONTROLLING TRANSDUCER MULTIPLEXING IN ULTRASOUND IMAGING SYSTEM

FIELD OF THE INVENTION

This invention generally relates to ultrasound imaging of human tissue and blood. In particular, the invention relates to a method and an apparatus for multiplexing vector data from an array of ultrasonic transducer elements to a bank of imaging channels.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focussed at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receive mode). The voltages produced at the receiving transducers are summed so that the net signal is indicative of the ultrasound reflected from a single focal point in the object. As with the transmission mode, this focussed reception of the ultrasonic energy is achieved by imparting separate time delay (and/or phase shifts) and gains to the signal from each receiving transducer.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focussed at a succession of ranges along the scan line as the reflected ultrasonic waves are received.

FIG. 1 depicts an ultrasound imaging system consisting of four main subsystems: a beamformer 2, processors 4 (including a separate processor for each different mode), a scan converter/display controller 6 and a kernel 8. System control is centered in the kernel, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. The scan converter broadcasts the vector parameters defined by the host to the subsystems via scan control bus 18.

The main data path begins with the analog RF inputs to the beamformer 2 from the transducer 20. The beamformer 2 outputs two summed digital baseband I,Q receive beams. The I,Q data is input to a processor 4, where it is processed according to the acquisition mode and output as processed vector (beam) data to the scan converter/display processor 6. The scan converter accepts the processed vector data and outputs the video display signals for the image to a color monitor 22.

Referring to FIG. 2, the beamformer is responsible for the transmit and receive beamforming. It includes a probe select switch 26 for activating a selected one of a plurality of transducers. Preferably, each transducer probe assembly incorporates a multiplexer 28 for multiplexing 128 beamformer channels to up to 256 transducer elements. Each transducer includes an array of separately driven transducer elements, each of which produces a burst of ultrasonic energy when energized by a pulsed waveform produced by a transmitter 30. The ultrasonic energy reflected back to the transducer array from the object under study is converted to an electrical signal by each receiving transducer element and applied separately to an analog receiver channel 34 through a set of transmit/receive (T/R) switches 32. Transmitter 30, receiver channels 34 and switches 32 are operated under control of a front end controller (not shown) in the beamformer. A complete scan is performed by acquiring a series of echoes in which switches 32 are set to their transmit position, transmitter 30 is gated ON momentarily to energize each transducer element, switches 32 are set to their receive position, and the subsequent echo signals produced by each transducer element are applied to the respective receiver channels 34.

The receive waveform for each channel is amplified and digitized. The digitized channel signal is then demodulated and filtered by the digital channel and beamforming circuitry 36 to form I and Q baseband signals. These baseband signals are appropriately delayed and pipeline summed to accomplish the steering and focusing of the receive beam. The summed I and Q signals are conditioned by the equalization board 38 to provide an optimal beamformed signal which is output to processors 4, which can perform a variety of calculations on these beam samples, depending on the type of image to be reconstructed.

It is known in diagnostic ultrasound imaging to provide a probe having a number of transducer elements greater than the number of available system receive channels and then time multiplexing the transducer elements outputs into respective receive channels. However, due to the hardware implementation of the beamformer in these systems, complex probe multiplexer switching schemes have not been required. In previous implementations, it was possible to multiplex transducer elements on a channel-by-channel basis, i.e., there was no requirement to multiplex the channels in groups.

One ultrasonic probe which can be used with the system depicted in FIGS. 2 has 192 transducer elements. In contrast, the beamformer has only 128 receive channels. However, a hardware implementation of that beamformer wherein a plurality of 8-channel time delay boards are pipelined does not allow channel-by-channel multiplexing. Instead channels must be multiplexed in minimum group sizes equal to the number of discrete receive channels on the time delay board to ensure that any discontinuous time delays due to non-adjacent transducer elements occur between time delay boards. This implies that only nine unique, 128-channel, multiplexer states are available. This hardware implementation demands additional creativity to control the probe multiplexer in a manner that provides adequate system performance, in terms of vector transition times (i.e., minimum pulse repetition intervals using multiplexed probes), minimal image artifacts (i.e., spectral or structured image artifact), and superior image quality.

Thus, there is a need for a transducer multiplexer control scheme which is compatible with beamforming channels that must be multiplexed in minimum group sizes.

SUMMARY OF THE INVENTION

The present invention is a technique for multiplexing linear probes that satisfies the foregoing need. In particular, the transducer multiplexer control scheme in accordance with the invention selects sets of 128 adjacent transducer elements using a scheme whereby successive active apertures are displaced relative to each other by a predetermined number of elements, e.g., eight. Due to the hardware constraint whereby beamforming channels must be multiplexed in minimum group sizes, e.g., 8-channel groups, successive active apertures must be displaced by eight transducer elements relative to each other.

While the active aperture is maintained constant for a predetermined number of vectors, the phase center of the vectors in the group is shifted so that offset is minimized. In the case wherein the active aperture is successively shifted by eight elements, the offset is varied between +4 and −4 during the interval between shifts of the active aperture. To maximize system performance, the amount of asymmetry (i.e., offset=phase center element number−active aperture physical center element number) in the active aperture must be limited to the greatest extent possible, without sacrificing aperture size (i.e., channel count). Smaller aperture sizes may be used through software apodization. Furthermore, the switching rate of the probe multiplexer limits system repetition rates in some imaging situations. As a result, the multiplexer state changes are limited, but not at the expense of image quality. Further, the transducer multiplexer control scheme must be general enough to support a variable vector spacing, different transducers, and imaging modes. Finally, the scheme must have the capability to generate additional, non-imaging, vectors at the edges of the frame for time spacers, buffer clearing, and processing components (e.g., median filter).

DETAILED DESCRIPTION OF THE PREFERRED EMBODIMENTS

Figure 3:
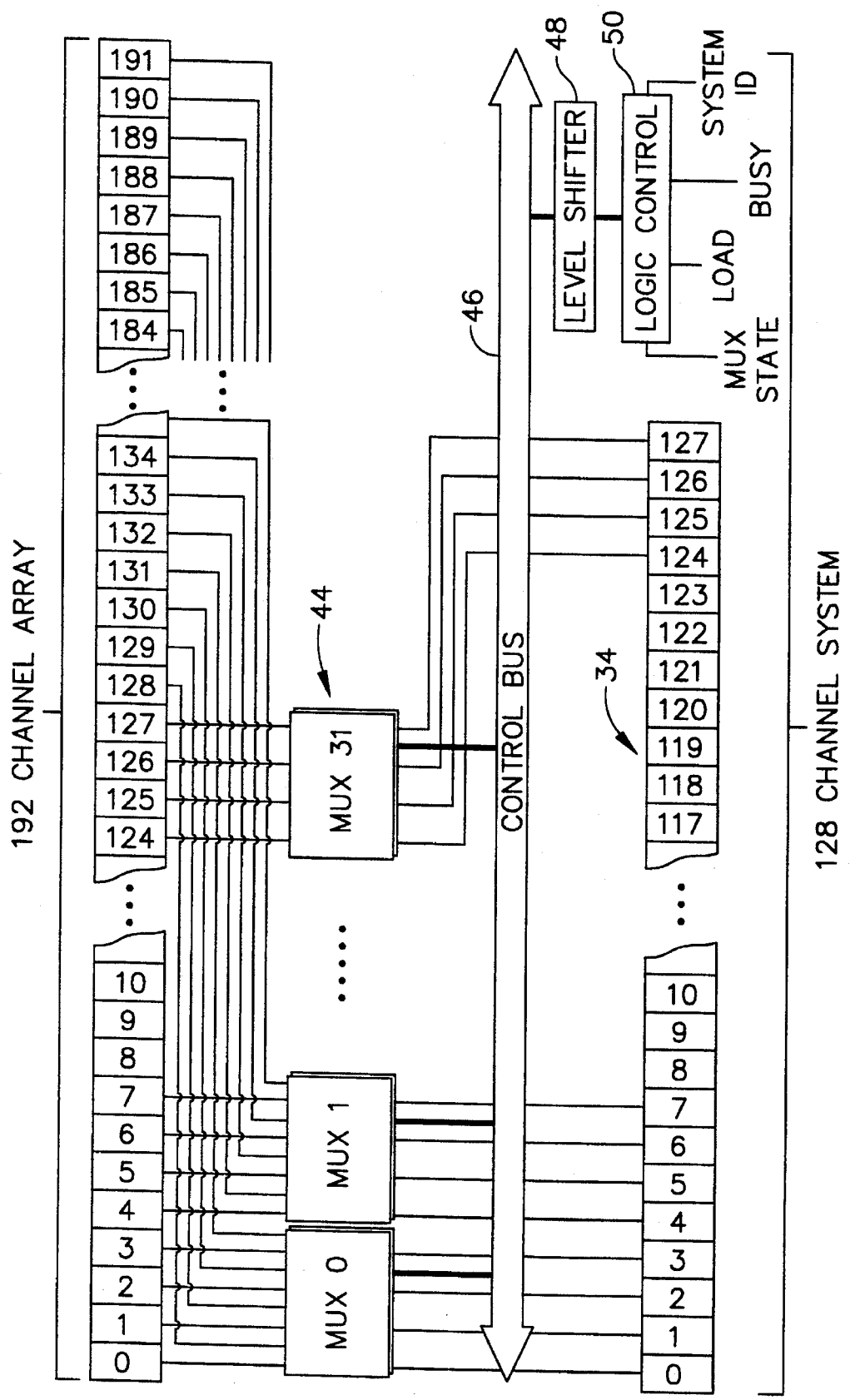
FIG. 3 is a block diagram showing the transducer multiplexer connections for multiplexing a 192-channel transducer array to a 128-channel beamformer.

If any of the transducers to be plugged into the system has an element count larger than the number of receive channels, the associated transducer connector is provided with a transducer multiplexer or commutator of the type shown in FIG. 3. Having an increased number of transducer elements is of particular importance when the transducer is a linear array since the size of the overall aperture controls the field of view in the image. In accordance a preferred embodiment of the present invention, a commutation scheme is utilized to interface 192 transducer elements with a 128-channel imaging system. However, the commutation scheme can be generalized to a number of different configurations, e.g., 128-channel system/256-channel transducer.

Figure 1:
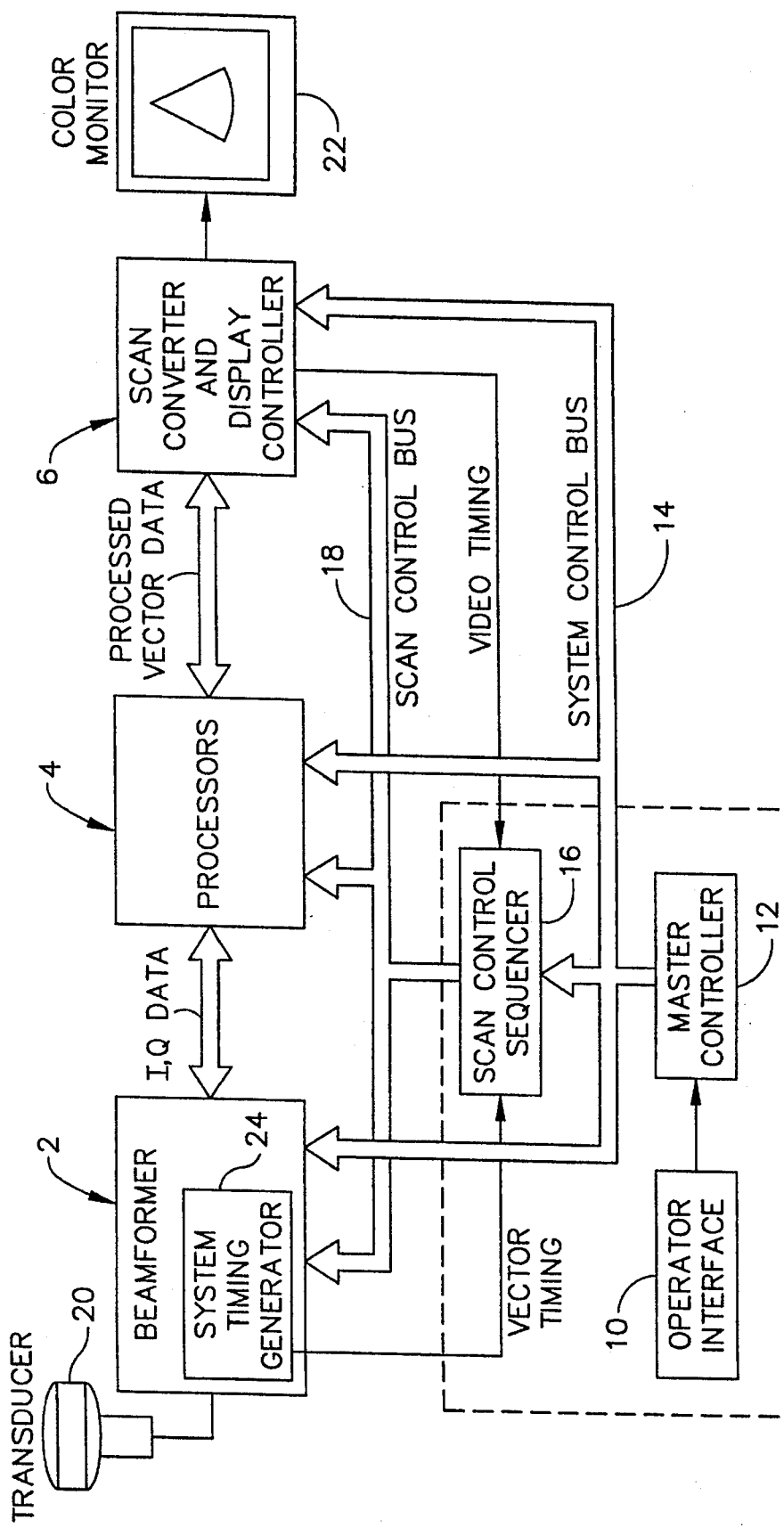
FIG. 1 is a block diagram of a conventional ultrasonic imaging system.
Figure 2:
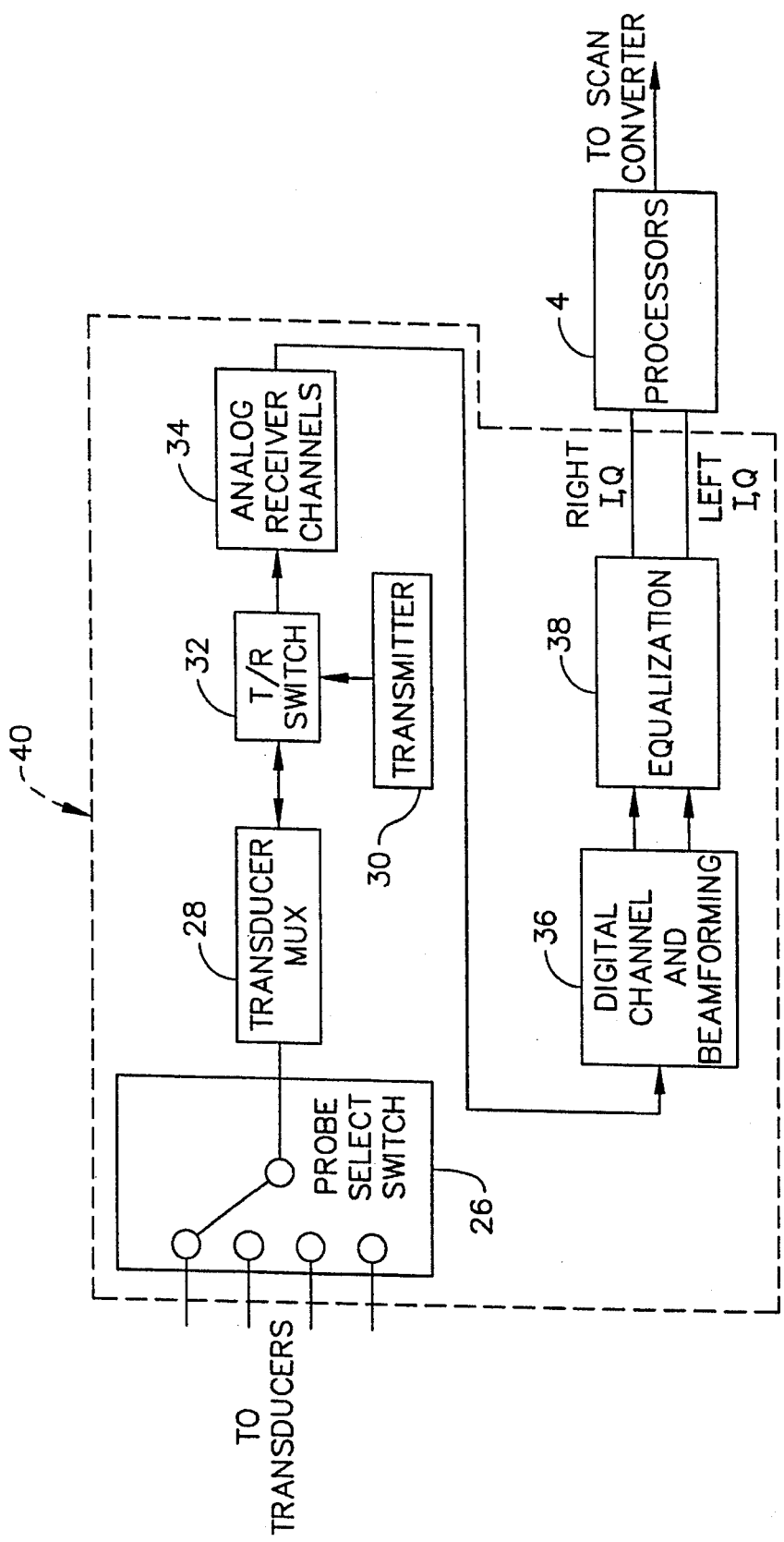
FIG. 2 is a block diagram of a receiver which forms part of the system of FIG. 1.

In accordance with the preferred embodiment of the present invention, a transducer multiplexer control program is stored in the master controller 12 (see FIG. 1). The master controller receives probe ID signals from the transducer probe assembly via a transducer interface (not shown) and then outputs the commutation state to a commutation state memory (not shown) on the transducer interface. The commutator state information stored in memory is used to control the multiplexer of the selected transducer connector. Radiofrequency data from the transducer element array is thus multiplexed from the transducer connector to the beamformer under the control of the master controller.

The multiplexing scheme shown in FIG. 3 allows the system to select an imaging aperture from within the total available aperture. This multiplexer is designed for use with imaging systems having different numbers of system channels.

The block diagram of FIG. 3 illustrates the conceptual design of the 192-channel multiplexer. Each element (0 to 191) of the transducer array 42 is connected directly to one input of one of a plurality of multiplexer integrated circuits 44 (MUX 0 to MUX 31). Each multiplexer chip is composed of eight analog switches wired in one of two ways. Devices which must switch connections between two transducer elements are wired to form a 2:1 multiplexer. The remainder are wired as single-pole single-throw switches, facilitating eight analog channels per integrated circuit 44. Each multiplexer chip output is connected directly to the beamformer system input. The design also includes a series of logic controls, indicated in FIG. 3 as the control bus 46. These lines are driven via level shifter 48 by digital logic control circuitry 50 which controls the configuration of the individual switches in the analog switch array.

Figure 4:
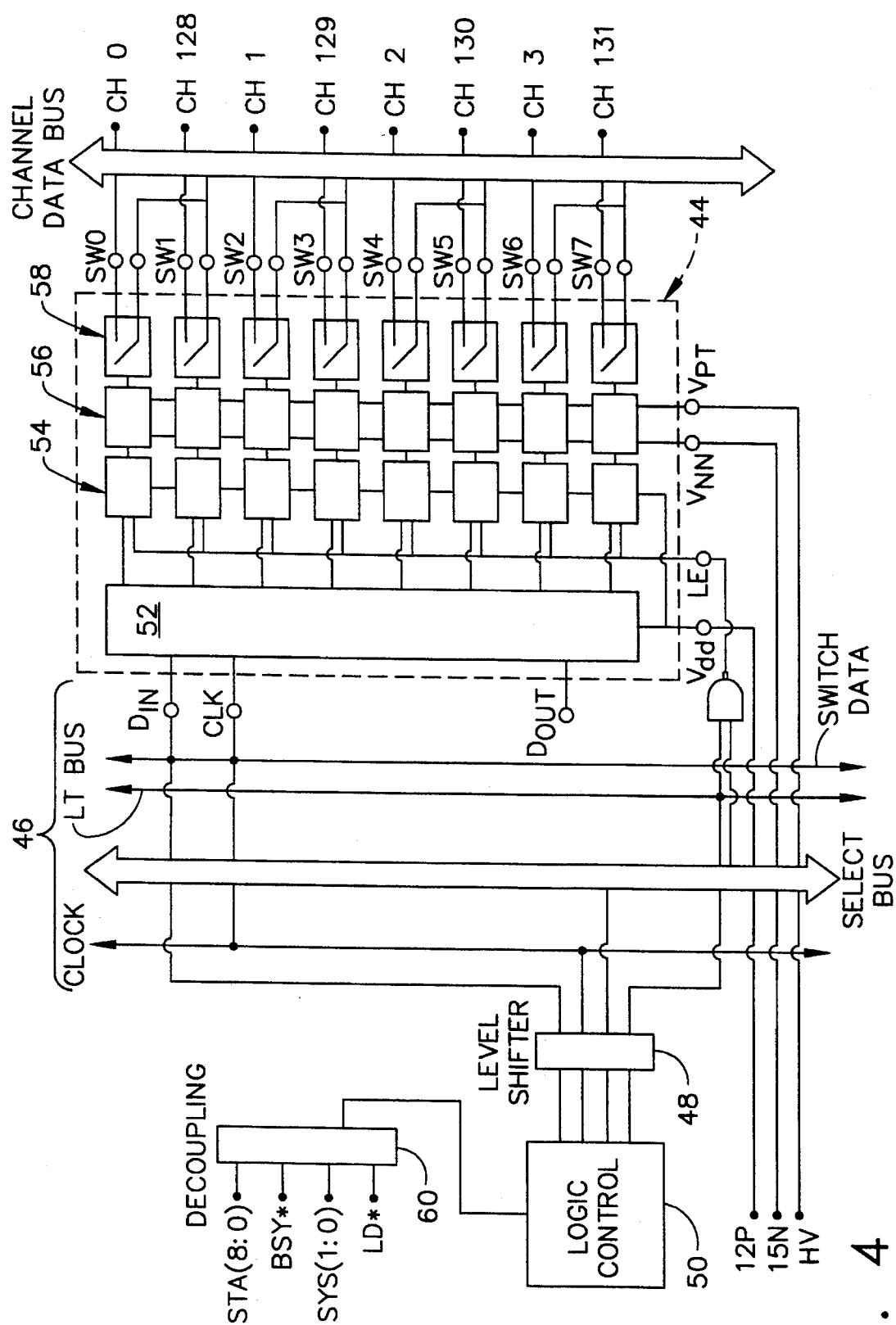
FIG. 4 is a logic diagram of a portion of the transducer multiplexer circuit shown in FIG. 3.

The circuit depicted in FIG. 4 is designed to provide the 128-channel system with the capability to service up to 256 elements on the transducer array. Each multiplexer chip 44 is an 8-channel high-voltage analog switch designed to switch up to eight analog signal lines via digital control. As seen in FIG. 4, the chip is composed of four sections: a shift register 52 for storage of the switch data; a latch 54 to lock in the data; level shifters 56 to drive the analog switches; and the switches 58 themselves. The switches 58 are connected to the system channel bus and the transducer elements in a 2:1 multiplexer configuration. For example, to connect element 0 to channel 0, SW0 must be closed and SW1 open. The reverse will connect element 128, releasing element 0. This scheme relies on the beamforming system to prevent multiple elements from connection to the same system channel.

The logic control of analog switch 44 is provided by the logic controller 50. The logic controller is preferably a programmable digital logic device which integrates all of the other functions required to drive the analog switch into a single package. These functions may include device selection, clock driver, level shifting and switch latch control. All data lines into logic controller 50 are decoupled by a conventional electrostatic discharge protection circuit 60 to prevent damage from electrostatic discharge.

The multiplexer 28 is designed to accommodate the requirements of at least two imaging systems having different numbers of elements in their respective transducer arrays. Because of the difference in channel count between the two systems, the logic controller 50 must be able to recognize a system ID from a 2-bit input.

The logic controller must also map the state provided by the system into the multiplexer configuration. This translation and the corresponding implementation circuitry comprise the majority of the controller functionality.

The analog switch depicted in FIG. 4 is actually eight analog single-pole single-throw switches, configured to form four 2:1 multiplexers. Therefore, each individual switch requires two control bits in the latch, a total of 8 bits for each analog switch.

The transducer interface provides the following signal set to control the probe commutators: STA(8:0), 9 bits of commutator state information; LD*, Load Data Strobe, for latching STA data on the rising edge; BSY*, 1 bit of data indicating the status of the commutator (the commutator returns one bit, the high state indicating that the commutator has finished changing states and is ready; and SYS(1:0), 2 bits of data which are sent to the probe (these System ID bits configure the probe commutator and allow it to correctly interpret the state information). The 9 bits of commutator state information are generated by the equalization board. The probe multiplexer selects a group of 128 contiguous elements in the transducer array on a vector-by-vector basis in dependence on the commutator state information.

The designation 12P in FIG. 4 indicates an LC-filtered version of a +12-V supply; 15N indicates a −15-V supply; and HV indicates a high-voltage bias voltage, namely +140 V.

In accordance with the invention, a transducer multiplexer control scheme is provided for controlling the multiplexing of output signals from a probe having $N_{ele}$ transducer elements to a beamformer having $N_{chan}$ channels, where $N_{ele} > N_{chan}$. The transducer multiplexer is controlled in a manner such that in the central portion of the image frame, the right and left edges of the active aperture are periodically shifted in tandem in accordance with the scheme depicted in FIG. 5. Furthermore, the time delays and phase rotations are selected such that the offset (i.e., the number of elements by which the vector phase center is displaced to the right or left of the physical center of the active aperture) is shifted in accordance with the scheme depicted in FIG. 6.

Figure 5:
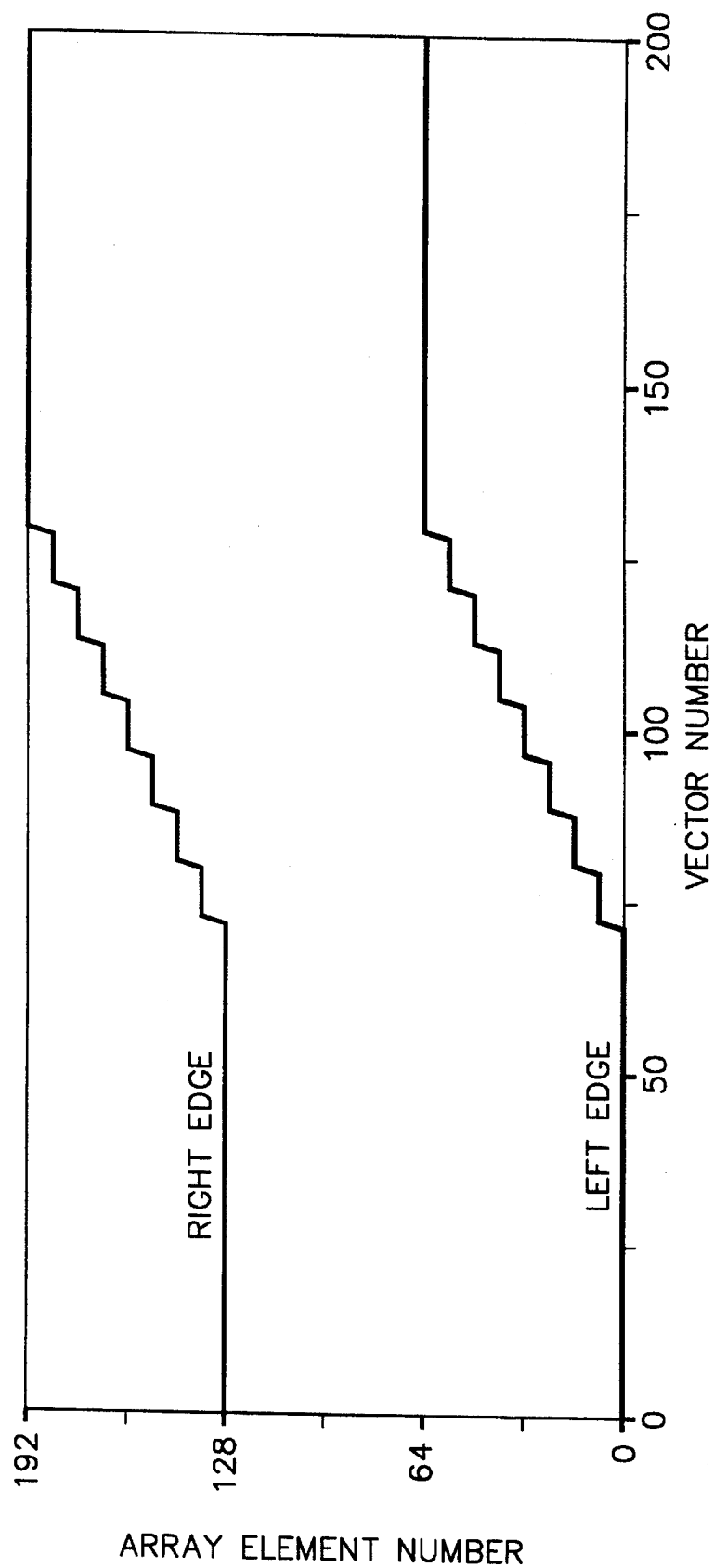
FIG. 5 is a graph showing two plots of the array element numbers of the right and left edges respectively of the possible active aperture as a function of vector number for a series of 200 vectors spaced at a single transducer pitch in accordance with the transducer multiplexer control scheme of the present invention.
Figure 6:
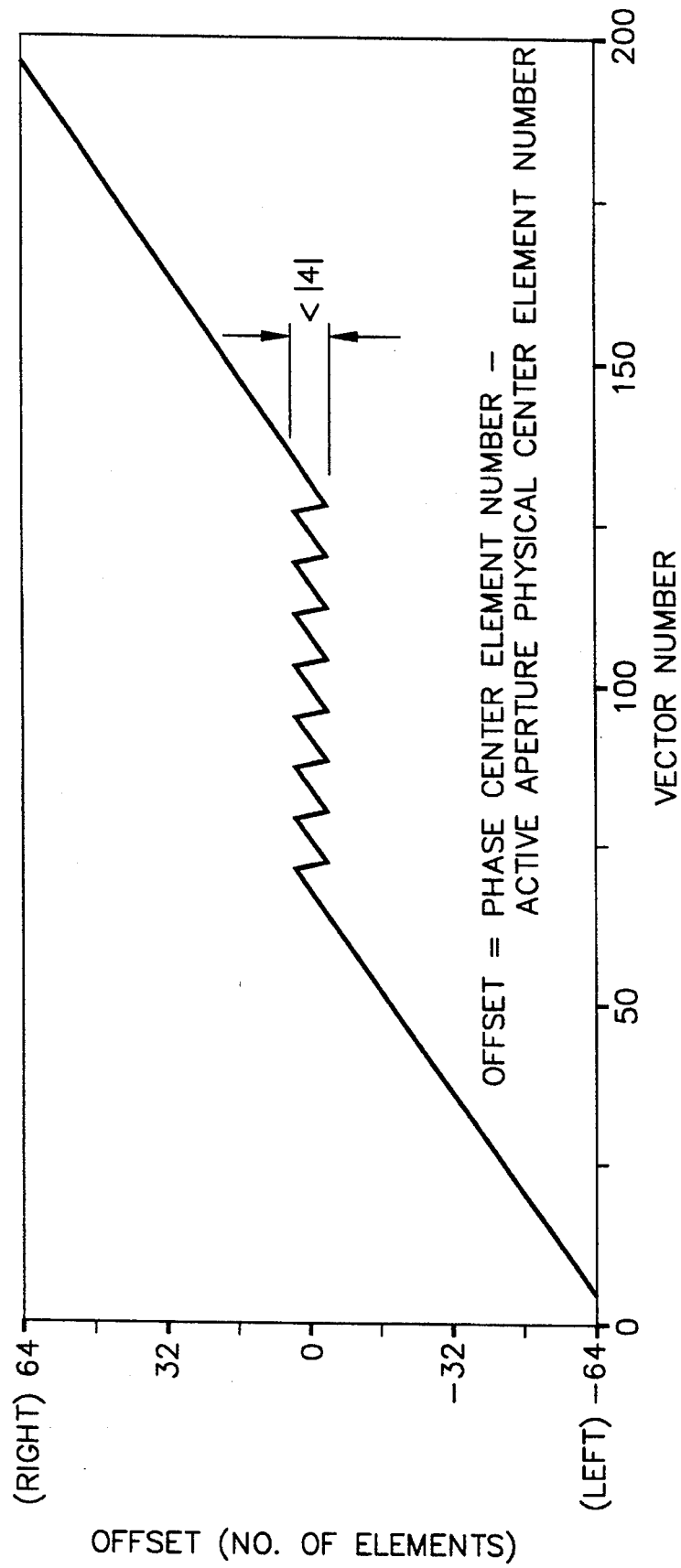
FIG. 6 is a graph showing a plot of the offset (number of elements) as a function of vector number for the same series of 200 vectors in accordance with the transducer multiplexer control scheme of the invention.

Each graph is constructed for the same series of 200 vectors space at a single transducer pitch. FIG. 5 represents a plot of the edges of the possible active aperture (128 channels will not be active at all times due to F number constraints) as a function of vector number. FIG. 6 shows the relationship between offset and vector number. The amount of asymmetry in the active aperture is limited to less than four channels (i.e., one half of a time delay board) in the center of the image frame. Only when the physical edges of the transducer are reached does the amount of asymmetry grow beyond four channels. This maximum amount of asymmetry will only be realized when the imaging system is operating in the far-field, since an active aperture of 128 channels is assumed in the plot. Depending on the transducer frequency, application, and inter-element spacing (IES), this situation may not occur often. Assuming that the imaging depth allows 128 channels to be used, this means that 40% of the vectors in the frame of 200 vectors are based on a phase center offset of less than four channels.

Figure 7:
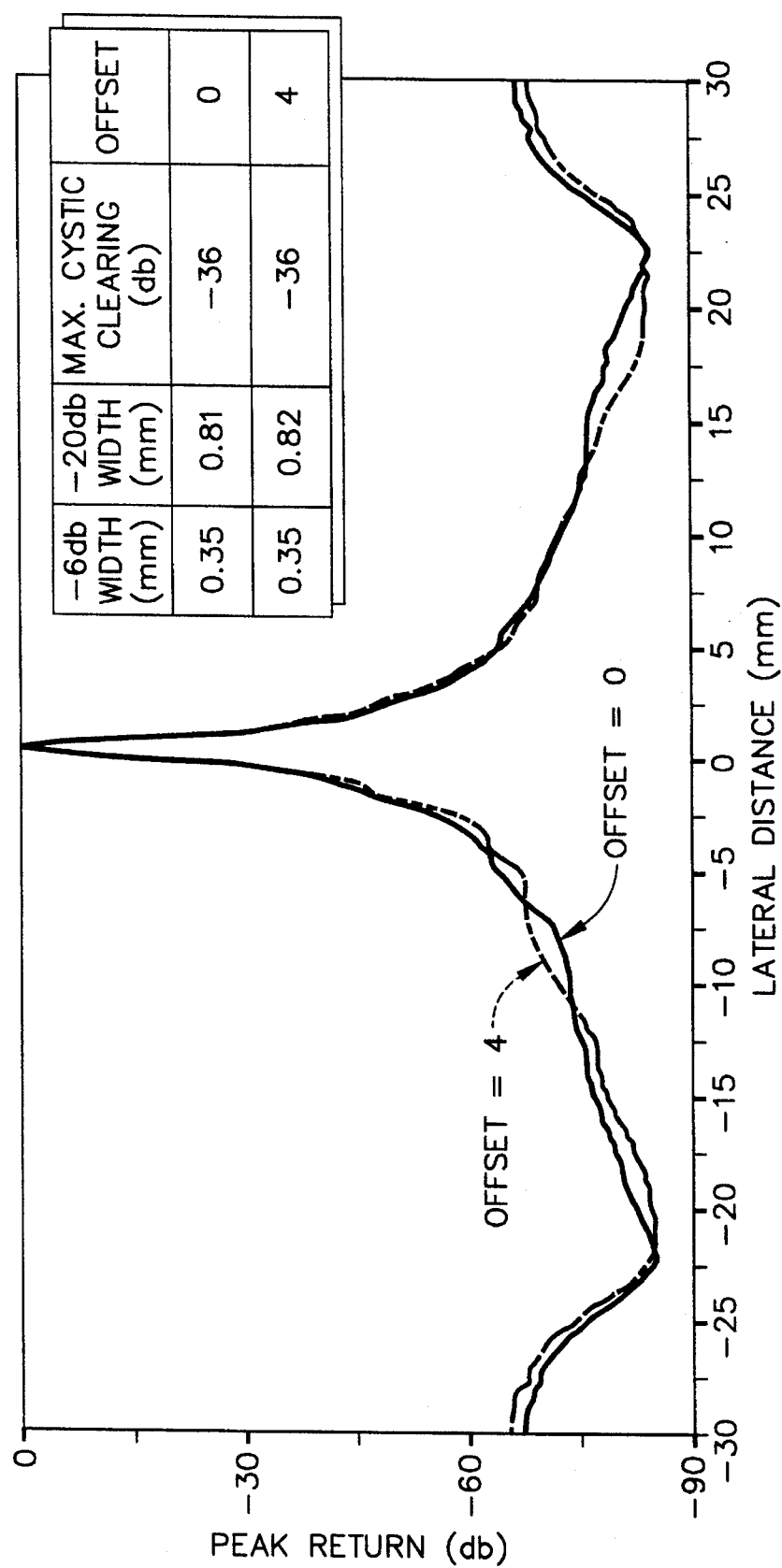
FIG. 7 is a graph showing two plots of the point spread function of a beam near the center of the image frame without steering, one plot for a symmetric aperture (i.e., offset=0) and the other plot for an asymmetric aperture with offset=4.
Figure 8:
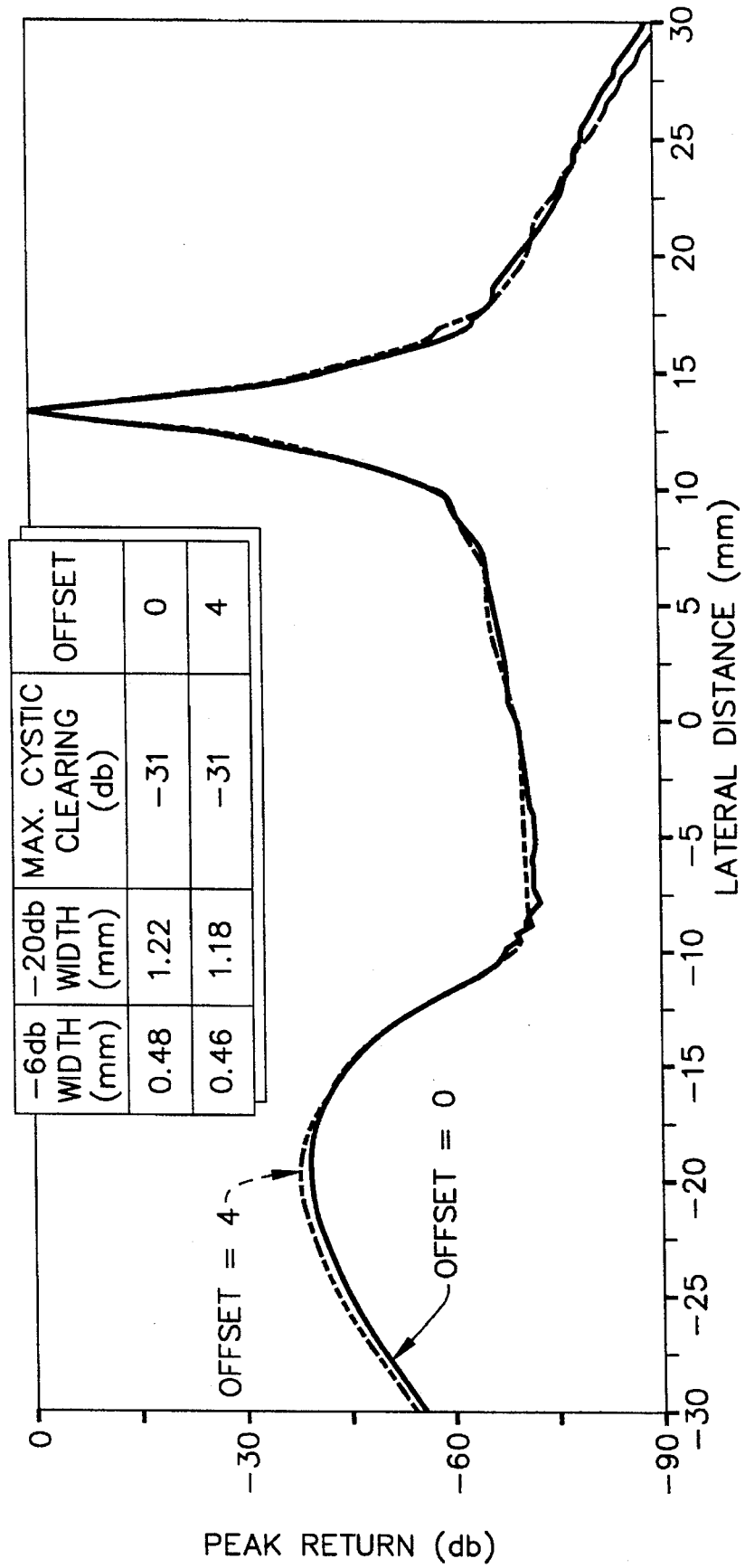
FIG. 8 is a graph showing two plots of the point spread function of a beam near the center of the image frame steered to 20°, one plot for a symmetric aperture (i.e., offset=0) and the other plot for an asymmetric aperture with offset=4.
Figure 9:
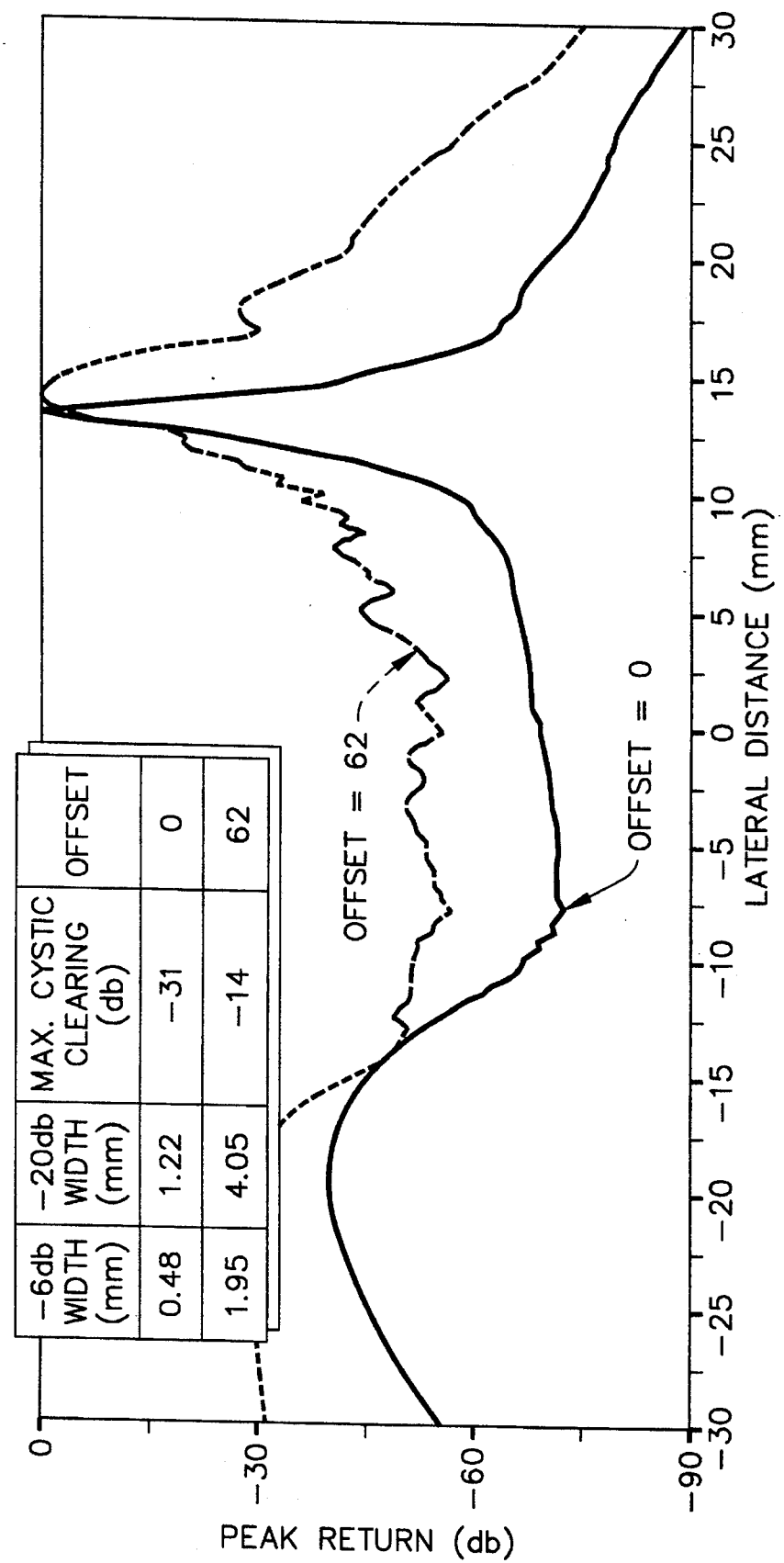
FIG. 9 is a graph showing two plots of the point spread function of a beam near the center of the image frame steered to 20°, one plot for a symmetric aperture (i.e., offset=0) and the other plot for an asymmetric aperture with offset=62.

The imaging performance of the transducer multiplexer control sequence in accordance with the present invention is summarized in FIGS. 7–9. FIG. 7 presents the point spread function (PSF) of a beam near the center of the image frame that is not steered. The two plots in FIG. 7 show the performance comparison of a symmetric aperture (i.e., offset=0) and an asymmetric aperture with an offset of four were compared. FIG. 7 shows that virtually no performance degradation is allowed by tightly controlling the offset amounts.

FIG. 8 repeats the same exercise, with the exception of adding a steering term to the situation. Again the result is the same: a small offset of four channels does not degrade the profile appreciably (although steering the array does reduce performance somewhat and bring the grating lobes into the plot).

FIG. 9 presents a worst case scenario: the beam is steered off-axis by 20° with the point spread functions constructed using a symmetric aperture and a 62-channel offset. In this case a large performance degradation is displayed. This type of degradation will be rare in most practical imaging situations and limited to the vectors near the edge of the frame.

The actual algorithm to compute vector positions, in the form of phase center distance from the physical center of the full aperture (i.e., 192×IES) and the left side of the active array is summarized in the following equations:

$$x_{PC,i} = \left( i - \frac{N_{vec}}{2} \right) S_{vec} \quad (1)$$

$$e_{PC,i} = \text{INT} \left( \frac{x_{PC,i} + \frac{N_{ele}S_{ele}}{2}}{S_{ele}} + \frac{1}{2} \right) \quad (2)$$

$$e_{LA,i} = \quad (3)$$

-continued $$e_{LA,i} = \begin{cases} 0 \text{ if } e_{PC,i} - \frac{N_{chan}}{2} < 4 \\ \text{MAX}\left[ N_{ele} - N_{chan}, 8 \cdot \left( \frac{e_{PC,i} - \frac{N_{chan}}{2} + 4}{8} \right) \right] \text{ otherwise} \end{cases}$$

where $x_{PC,i}$ is the position along the probe face of the phase center (in mm) for the i-th vector; $e_{PC,i}$ is the number of the transducer element closest to the phase center for the i-th vector; $e_{LA,i}$ is the number of the transducer element at the left edge of the active aperture for the i-th vector; $N_{ele}$ is the maximum number of transducer elements; $N_{chan}$ is the maximum number of receive channels; $N_{vec}$ is the number of vectors; $S_{ele}$ is the inter-element spacing; and $S_{vec}$ is the vector spacing.

Equation (1) computes the phase center position in mm from the physical center, assuming a constant vector spacing. The equation allows a selectable vector spacing and also allows any arbitrary number of vectors to be computed. This is useful for adding additional "junk" vectors outside the actual image area.

Equation (2) is an intermediate step used to compute the left side of the active array. The left side of the array is required for beamforming calculations, as well as probe multiplexer state computation. This equation requires knowledge of the maximum number of elements of the probe and the IES.

Equation (3) computes the element number of the left side of the maximum active aperture; the equation saturates the value of the left side element at the physical limitations of the array, e.g., will not allow the output to exceed 192 elements. The MAX function selects the larger of the two quantities in the formula. Integer math and rounding are used to select the correct element.

Table I shows the mapping of the left aperture element array values to the form required by the equalization board and probe multiplexer hardware. Equation (3) computes only nine unique values corresponding to the probe element used for multiplexing. The system software should format the left aperture array data into the multiplexer state data of the second column. The probe commutation table on the equalization board is sized 4K×8 (i.e., 4 banks×1024 vectors/bank×8 bits of data) to define the multiplexer state from the second column of Table I.

TABLE I

| PROBE MULTIPLEXER STATE MAPPING | | | |
|---|---|---|---|
| Left Aperture Element | Multiplexer State | Right Aperture Element | Phase Center Element Range |
| 0 | 00$_{HEX}$ | 127 | 0–68 |
| 8 | 08$_{HEX}$ | 135 | 69–76 |
| 16 | 10$_{HEX}$ | 143 | 77–84 |
| 24 | 18$_{HEX}$ | 151 | 85–92 |
| 32 | 20$_{HEX}$ | 159 | 93–100 |
| 40 | 28$_{HEX}$ | 167 | 101–108 |
| 48 | 30$_{HEX}$ | 175 | 109–116 |
| 56 | 38$_{HEX}$ | 183 | 117–124 |
| 64 | 40$_{HEX}$ | 191 | 125–191 |

The foregoing preferred embodiment has been disclosed for the purpose of illustration. Variations and modifications will be readily apparent to those skilled in the art of ultrasonic imaging systems. All such variations and modifications are intended to be encompassed by the claims set forth hereinafter.

I claim:

1. An ultrasound imaging system comprising:

an array of ultrasound transducer elements, wherein the number of transducer elements in said array is $N_{ele}$;

a multiplicity of receive channels, wherein the number of receive channels of said multiplicity is $N_{chan}$ and $N_{ele} > N_{chan}$;

means for multiplexing imaging data from said array of ultrasound transducer elements to said multiplicity of receive channels;

beamforming means coupled to each of said receive channels for forming vector data based on echo data received by said transducer elements;

means for controlling said multiplexing means such that signals from a first multiplicity of adjacent transducer elements are multiplexed to said multiplicity of receive channels when said multiplexer is in a first state and signals from a second multiplicity of adjacent transducer elements are multiplexed to said multiplicity of receive channels when said multiplexer is in a second state, said first multiplicity of adjacent transducer elements forms a first active aperture and said second multiplicity of adjacent transducer elements forms a second active aperture, wherein said first active aperture is shifted by a predetermined number of transducer elements relative to said second active aperture, and said predetermined number is greater than unity;

transmission mode means for controlling said transducer elements to transmit first and second pluralities of ultrasound scan beams;

means for controlling said beamforming means such that vector data corresponding to a first plurality of vectors is formed in response to echo data produced by said first plurality of ultrasound scan beams and vector data corresponding to a second plurality of vectors is formed in response to echo data produced by said second plurality of ultrasound scan beams, wherein each of the vectors of said first plurality of vectors has a phase center which is shifted relative to the phase center of an adjacent vector in said first plurality of vectors, and each of the vectors of said second plurality of vectors has a phase center which is shifted relative to the phase center of an adjacent vector in said second plurality of vectors; and means for displaying pixel data derived from said vector data.

2. The ultrasound imaging system as defined in claim 1, wherein said multiplexing means and said beamforming means are controlled in accordance with the following equations:

$$x_{PC,i} = \left( i - \frac{N_{vec}}{2} \right) S_{vec}$$

$$e_{PC,i} = \text{INT}\left( \frac{x_{PC,i} + \frac{N_{ele} S_{ele}}{2}}{S_{ele}} + \frac{1}{2} \right)$$

$$e_{LA,i} = \begin{cases} 0 \text{ if } e_{PC,i} - \frac{N_{chan}}{2} < 4 \\ \text{MAX}\left[ N_{ele} - N_{chan}, 8 \cdot \left( \frac{e_{PC,i} - \frac{N_{chan}}{2} + 4}{8} \right) \right] \text{ otherwise} \end{cases}$$

wherein $x_{PC,i}$ is the position along the array face of the phase center (in mm) for an i-th vector; $e_{PC,i}$ is the number of the transducer element closest to the phase center for said i-th vector; $e_{LA,i}$ is the number of the transducer element at the left edge of the active aperture for said i-th vector; $N_{vec}$ is the number of vectors; $S_{ele}$ is the inter-element spacing; and $S_{vec}$ is the vector spacing.

3. The ultrasound imaging system as defined in claim 1, wherein said predetermined number is eight.

4. The ultrasound imaging system as defined in claim 1, wherein said means for controlling said beamforming means is controlled such that the offset does not exceed four for vector data to be displayed over a central section of an image frame.

5. A method for producing an ultrasound image of anatomy in an ultrasound imaging system having an array of ultrasound transducer elements, the number of transducer elements in said array being $N_{ele}$, and a multiplicity of receive channels, the number of said receive channels being $N_{chan}$, wherein. $N_{ele} > N_{chan}$, comprising the steps of:

controlling said array of ultrasound transducer elements to transmit first and second pluralities of ultrasound scan beams in a transmission mode, and to generate first echo data in response to echoes from said first plurality of ultrasound scan beams in a first state and second echo data in response to echoes from said second plurality of ultrasound scan beams in a second state in a reception mode;

multiplexing imaging data from said array of ultrasound transducer elements to said multiplicity of receive channels such that signals from a first multiplicity of adjacent transducer elements are multiplexed to said multiplicity of receive channels in said first state and signals from a second multiplicity of adjacent transducer elements are multiplexed to said multiplicity of receive channels in said second state, said first multiplicity of adjacent transducer elements forming a first active aperture and said second multiplicity of adjacent transducer elements forming a second active aperture, wherein said first active aperture is shifted by a predetermined number of transducer elements relative to said second active aperture, and said predetermined number is greater than unity;

forming vector data based on echo data received by said transducer elements, said vector data comprising a first plurality of vectors formed in response to said first echo data and a second plurality of vectors formed in response to said second echo data, wherein each of the vectors of said first plurality of vectors has a phase center which is shifted relative to the phase center of an adjacent vector in said first plurality of vectors, and each of the vectors of said second plurality of vectors has a phase center which is shifted relative to the phase center of an adjacent vector in said second plurality of vectors; and displaying pixel data derived from said vector data.

6. The method as defined in claim 5, wherein said multiplexing and vector data forming steps are performed in accordance with the following equations:

$$x_{PC,i} = \left( i - \frac{N_{vec}}{2} \right) S_{vec}$$

$$e_{PC,i} = \text{INT} \left( \frac{x_{PC,i} + \frac{N_{ele}S_{ele}}{2}}{S_{ele}} + \frac{1}{2} \right)$$

$$e_{LA,i} =$$

-continued $$\begin{cases} 0 \text{ if } e_{PC,i} - \frac{N_{chan}}{2} < 4 \\ \text{MAX} \left[ N_{ele} - N_{chan}, 8 \cdot \left( \frac{e_{PC,i} - \frac{N_{chan}}{2} + 4}{8} \right) \right] \text{ otherwise} \end{cases}$$

wherein $x_{PC,i}$ is the position along the array face of the phase center (in mm) for an i-th vector; $e_{PC,i}$ is the number of the transducer element closest to the phase center for said i-th vector; $e_{LA,i}$ is the number of the transducer element at the left edge of the active aperture for said i-th vector; $N_{vec}$ is the number of vectors; $S_{ele}$ is the inter-element spacing; and $S_{vec}$ is the vector spacing.

7. The method as defined in claim 5, wherein said predetermined number is eight.

8. The method as defined in claim 5, wherein the offset does not exceed four for vector data to be displayed over a central section of an image frame.

9. An ultrasound imaging system comprising:

an array of ultrasound transducer elements, wherein the number of transducer elements in said array is $N_{ele}$;

a multiplicity of receive channels, wherein the number of receive channels of said multiplicity is $N_{chan}$ and $N_{ele} > N_{chan}$;

means for multiplexing imaging data from said array of ultrasound transducer elements to said multiplicity of receive channels;

means for controlling said multiplexing means such that the active aperture of said array of transducer elements is scanned across said array, each successive active aperture being shifted relative to the preceding active aperture by a predetermined number of transducer elements, said predetermined number being greater than unity;

beamforming means coupled to each of said receive channels for forming vector data based on echo data received by said transducer elements;

means for displaying pixel data derived from said vector data;

means for controlling said beamforming means such that vector data corresponding to a respective plurality of vectors is formed in response to echo data generated in response to echoes from said respective plurality of ultrasound scan beams, wherein each vector within a respective plurality of vectors has a phase center which is shifted relative to the phase center of an adjacent vector within said respective plurality of vectors, and said multiplexing means and said beamforming means are controlled in accordance with the following equations:

$$x_{PC,i} = \left( i - \frac{N_{vec}}{2} \right) S_{vec}$$

$$e_{PC,i} = \text{INT} \left( \frac{x_{PC,i} + \frac{N_{ele}S_{ele}}{2}}{S_{ele}} + \frac{1}{2} \right)$$

$$e_{LA,i} =$$

$$\begin{cases} 0 \text{ if } e_{PC,i} - \dfrac{N_{chan}}{2} < 4 \\ \text{MAX}\left[ N_{ele} - N_{chan}, 8 \cdot \left( \dfrac{e_{PC,i} - \dfrac{N_{chan}}{2} + 4}{8} \right) \right] \text{ otherwise} \end{cases}$$

wherein $x_{PC,i}$ is the position along the array face of the phase center (in mm) for an i-th vector; $e_{PC,i}$ is the number of the transducer element closest to the phase center for said i-th vector; $e_{LA,i}$ is the number of the transducer element at the left edge of the active aperture for said i-th vector; $N_{vec}$ is the number of vectors; $S_{ele}$ is the inter-element spacing; and $S_{vec}$ is the vector spacing.

10. An ultrasound imaging system comprising:
    an array of ultrasound transducer elements, wherein the number of transducer elements in said array is $N_{ele}$;
    a multiplicity of receive channels, wherein the number of receive channels of said multiplicity is $N_{chan}$ and $N_{ele} > N_{chan}$;
    means for multiplexing imaging data from said array of ultrasound transducer elements to said multiplicity of receive channels;
    means for controlling said multiplexing means such that the active aperture of said array of transducer elements is scanned across said array, each successive active aperture being shifted relative to the preceding active aperture by a predetermined number of transducer elements, said predetermined number being greater than unity;
    beamforming means coupled to each of said receive channels for forming vector data based on echo data received by said transducer elements;
    means for displaying pixel data derived from said vector data;
    means for controlling said beamforming means such that vector data corresponding to a respective plurality of vectors is formed in response to echo data generated in response to echoes from said respective plurality of ultrasound scan beams,
    wherein each vector within a respective plurality of vectors has a phase center which is shifted relative to the phase center of an adjacent vector within said respective plurality of vectors, and said means for controlling said beamforming means is controlled such that the offset does not exceed four for vector data to be displayed over a central section of an image frame.

11. An ultrasound imaging system comprising:
    an array of ultrasound transducer elements, wherein the number of transducer elements in said array is $N_{ele}$;
    a multiplicity of receive channels, wherein the number of receive channels of said multiplicity is $N_{chan}$ and $N_{ele} > N_{chan}$;
    means for multiplexing imaging data from said array of ultrasound transducer elements to said multiplicity of receive channels;
    means for controlling said multiplexing means such that the active aperture of said array of transducer elements is scanned across said array, each successive active aperture being shifted relative to the preceding active aperture by a predetermined number of transducer elements, said predetermined number being greater than unity;
    beamforming means coupled to each of said receive channels for forming vector data based on echo data received by said transducer elements;
    means for displaying pixel data derived from said vector data;
    means for controlling said beamforming means such that vector data corresponding to a respective plurality of vectors is formed in response to echo data generated in response to echoes from said respective plurality of ultrasound scan beams,
    wherein each vector within a respective plurality of vectors has a phase center which is shifted relative to the phase center of an adjacent vector within said respective plurality of vectors, and said means for controlling said beamforming means is controlled such that the offset is minimized while maximum receiver aperture size is maintained.

\* \* \* \* \*